United States Patent

Lin

(10) Patent No.: US 9,253,493 B2
(45) Date of Patent: Feb. 2, 2016

(54) FAST MOTION ESTIMATION FOR MULTIPLE REFERENCE PICTURES

(75) Inventor: Shu Lin, Santa Clarita, CA (US)

(73) Assignee: THOMSON LICENSING, Boulogne-Billancourt (FR)

( * ) Notice: Subject to any disclaimer, the term of this patent is extended or adjusted under 35 U.S.C. 154(b) by 1698 days.

(21) Appl. No.: 11/660,473

(22) PCT Filed: Jun. 7, 2005

(86) PCT No.: PCT/US2005/019852
§ 371 (c)(1),
(2), (4) Date: Feb. 16, 2007

(87) PCT Pub. No.: WO2006/025904
PCT Pub. Date: Mar. 9, 2006

(65) Prior Publication Data
US 2008/0063065 A1    Mar. 13, 2008

Related U.S. Application Data

(60) Provisional application No. 60/605,903, filed on Aug. 31, 2004.

(51) Int. Cl.
*H04N 19/105* (2014.01)
*H04N 19/142* (2014.01)
*H04N 19/51* (2014.01)
*H04N 19/573* (2014.01)

(52) U.S. Cl.
CPC ............ *H04N 19/142* (2014.11); *H04N 19/51* (2014.11); *H04N 19/573* (2014.11)

(58) Field of Classification Search
USPC ............ 375/240.12, 240.13, 240.14, 240.16; 380/217
See application file for complete search history.

(56) References Cited

U.S. PATENT DOCUMENTS 5,592,226 A * 1/1997 Lee et al. ................. 375/240.14
6,748,114 B1    6/2004 Ishikawa
(Continued)

FOREIGN PATENT DOCUMENTS

EP    1422928    5/2004
JP    8-307860    11/1996
(Continued)

OTHER PUBLICATIONS

Chang et al., "A Novel Approach to Fast Multi-Frame Selection for H.264 Video Coding," Proceedings of the 2003 International Symposium on Circuits and Systems, ISCAS '03, pp. 704-707, Jun. 25, 2003.*

(Continued)

*Primary Examiner* — Eleni Shiferaw
*Assistant Examiner* — Paul Callahan
(74) *Attorney, Agent, or Firm* — Palak Bhakta; Vincent E. Duffy

(57) ABSTRACT

An apparatus and corresponding method for fast motion estimation with multiple reference pictures are provided, where an exemplary video encoder for encoding video signal data for an image block relative to multiple reference pictures includes a fast motion estimator for providing motion vectors corresponding to one of the reference pictures, including a scene detection portion for performing fast motion estimation while excluding reference pictures that fall across a scene change; and where a corresponding method for encoding video signal data for an image block having multiple reference pictures includes receiving a substantially uncompressed image block, detecting a scene change, excluding reference pictures that fall across the scene change, and computing motion vectors corresponding to a difference between the image block and one of the plurality of reference pictures.

24 Claims, 3 Drawing Sheets

(56) References Cited

U.S. PATENT DOCUMENTS

| | | | |
|---|---|---|---|
| 7,936,818 B2* | 5/2011 | Jayant et al. | 375/240.05 |
| 2003/0138044 A1 | 7/2003 | Ueda et al. | |
| 2006/0098738 A1* | 5/2006 | Cosman et al. | 375/240.16 |

FOREIGN PATENT DOCUMENTS

| | | |
|---|---|---|
| JP | 10-271514 | 10/1998 |
| JP | 2001078196 | 3/2001 |
| WO | WO03/094526 | 11/2003 |
| WO | WO2004/068838 | 8/2004 |

OTHER PUBLICATIONS

Thomas Wiegand et. al., Draft ITU-T Recommendation and Final Draft International Standard of Joint Video Specification (ITU-T Rec.H.264 | ISO/IEC 14496-10 O/IEC AVC), Joint Video Team (JVT) of ISO/IEC MPEG & C.C.I.T.T. VCEG (ISO/IEC JTC1/SC29/WG11 and ITU-T SG16Q. 6), May 27, 2003, JVT-G050r1, p. 3.

Yu-Wen Huang et al.: "Analysis and reduction of reference frames for motion estimation in mpeg-4 avc/jvtih.264" 2003 International Conference on Jul. 6-9, 2003, Piscataway, NJ vol. 2, Jul. 6, 2003, pp. 809-812, XP010650595.

Fan J. et al.: "Adaptive Motion-Compensated Video Coding Scheme Towards Content-Based Bit Rate Allocation" Journal of Electronic Imaging, SPIE + IS&T, US, vol. 9, No. 4, Oct. 2000 pp. 1017-9909.

Hsieh B-Y et al.: "Fast Motion /Estimation Algorithm for H.265/MPEG-4 by using Multiple Reference Frame Skipping Criteria" Proceedings of the SPIE. SPIE. Bellingham, VA, US vol. 5150, No. 1, Jul. 8, 2003, pp. 1551-1560, XP00119750.

Hung-Ju Li et al.: "Fast multiple reference frame selection method for motion estimation in JVT/H.264" Circuits and Systems, 2004. Proceedings. The 2004 IEEE Asia-Pacific Conference on Tainan, Taiwan Dec. 6-9, 204, Piscataway NJ, USA, vol. 1, Dec. 6, 2004 pp. 605-608 XP010783186.

Yanfei Shen et al.: "Fast multi-frame motion estimation algorithm in H.264" Signal Processing, 2004, Proceedings. ICSP 04. 2004 7th international Conference on Beijing, China Aug. 31-Sep. 4, 2004. Piscataway, NJ, USA, IEEE Aug. 31, 2004, pp. 1187-1190 XP010810611.

Lee J. et al.: "Adaptiver Frame Type Selection for Low Bit-Rate Video Coding" SPIE Visual Communications and Image Processing, XX, XX, vol. 2308, No. Part 2, Sep. 25, 1994, pp. 1411-1422, XP002035257.

Yeping Su et al.: "Fast multiple reference Frame Motion Estimation for h.264" Multimedia and Expo, 2004, ICME 04, 2004 IEEE International Conference on Taipei, Taiwan Jun. 27-30, 2004, Piscataway, NJ USA, IEEE vol. 1, Jun. 27, 2004, pp. 695-698, XP010770906.

Search Report dated Aug. 31, 2005.

* cited by examiner

FAST MOTION ESTIMATION FOR MULTIPLE REFERENCE PICTURES

CROSS-REFERENCE TO RELATED APPLICATION

This application claims the benefit, under 35 U.S.C. §365 of International Application PCT/US05/19852, filed Jun. 7, 2005, which was published in accordance with PCT Article 21(2) on Mar. 9, 2006 in English and which claims the benefit of U.S. provisional patent application No. 60/605,903, filed Aug. 31, 2004.

FIELD OF THE INVENTION

The present invention is directed towards video encoders, and in particular, towards motion estimation algorithms for multiple reference pictures in video encoders.

BACKGROUND

Video data is generally processed and transferred in the form of bit streams. Typical video compression encoders gain much of their compression efficiency by forming a reference picture prediction of a picture to be encoded, and encoding the difference between the current picture and the prediction. The more closely that the prediction is correlated with the current picture, the fewer the number of bits that are needed to compress that picture, thereby increasing the efficiency of the process. Thus, it is desirable for the best possible reference picture prediction to be formed.

In many video compression standards, including Moving Picture Experts Group ("MPEG")-1, MPEG-2 and MPEG-4, the motion between a previous reference picture and the current picture is estimated to form a motion compensated version of the previous reference picture. The motion compensated version of the previous reference picture is used as a prediction for the current picture, and only the difference between the current picture and the prediction is coded.

Motion estimation plays an important role in current video coding systems, and is generally the most computationally complex part of the encoder. The block matching algorithm is employed by most current video coding standards. A full search strategy, which estimates the amount of motion on a block-by-block basis, is a popular motion estimation method. Unfortunately, the complexity of the full search strategy is extremely high, especially for advanced video coding standards such as H.264, which employ multi-reference pictures and multi-block types. Several fast-search algorithms, such as the three step search, newer three step search, diamond search, zonal search, hierarchical or multi-resolution search, or combinations thereof have been proposed. Such algorithms reduce the complexity by reducing the number of searching points. Unfortunately, they tend to trap into local minima on the error surface. Thus, their performance is generally worse than the full search strategy.

Block motion estimation is employed by most current video coding standards to reduce the bit rate. Block motion estimation for video coding has been well explored but few algorithms have been proposed for multi-reference picture and multi-block type selection, such as may be used in the H.263++ and JVT/H.264/MPEG AVC standards, for example.

In the JVT/H.264 standard, various modes are provided for motion compensation. Each motion-compensated macroblock mode corresponds to a fixed size block. The block can be partitioned into 16×16, 16×8, 8×16, and 8×8. The 8×8 block can be further sub-partitioned into block sizes of 8×4, 4×8, or 4×4. Thus, 7 block types are supported in total. The prediction signal for each predictive-coded m×n block is obtained by displacing an area of the corresponding reference picture, which is specified by a translational motion vector that is differentially coded from a motion vector predictor. JVT/H.264 also supports multi-picture motion-compensated prediction. That is, more than one prior coded picture can be used as a reference for building the prediction signal of predictive coded blocks. Accordingly, for motion estimation, the encoder has to make decisions for which block type and which reference picture should be selected. This multi-reference picture and multi-block type selection makes motion searching more complicated.

Multiple reference pictures are used for video encoding to achieve better compression. For example, the JVT/H.264 standard permits the use of up to 15 reference frames. Typically, the motion vectors of a predicted block are calculated from all of the reference pictures, and then the best apparent prediction is chosen for the block. Thus, in this example, the computational burden of the motion estimation process might be up to 15 times that of a single reference picture. It will prohibit from using more reference frames, or increase the complexity of the encoder, or slow a software encoding speed.

Unfortunately, the slow and/or complex computations for multiple reference pictures adversely affect system performance and/or cost, respectively, because the motion estimation of a predicted block is applied to all reference pictures. Thus, what is needed is a method for increasing the speed of the motion estimation process where multiple reference pictures are used.

SUMMARY

These and other drawbacks and disadvantages of the prior art are addressed by an apparatus and method for fast motion estimation with multiple reference pictures in video encoders.

A video encoder is provided for encoding video signal data for an image block relative to multiple reference pictures, including a fast motion estimator for providing motion vectors corresponding to one of the reference pictures, and a scene detection portion for performing fast motion estimation while excluding reference pictures that fall across a scene change.

A corresponding method is provided for encoding video signal data for an image block having multiple reference pictures includes receiving a substantially uncompressed image block, detecting a scene change, excluding reference pictures that fall across the scene change, and computing motion vectors corresponding to a difference between the image block and one of the plurality of reference pictures.

These and other aspects, features and advantages of the present invention will become apparent from the following description of exemplary embodiments, which is to be read in connection with the accompanying drawings.

BRIEF DESCRIPTION OF THE DRAWINGS

The present invention produces fast motion estimation for multiple reference pictures for video encoders in accordance with the following exemplary figures, in which.

DETAILED DESCRIPTION OF PREFERRED EMBODIMENTS

Figure 1:
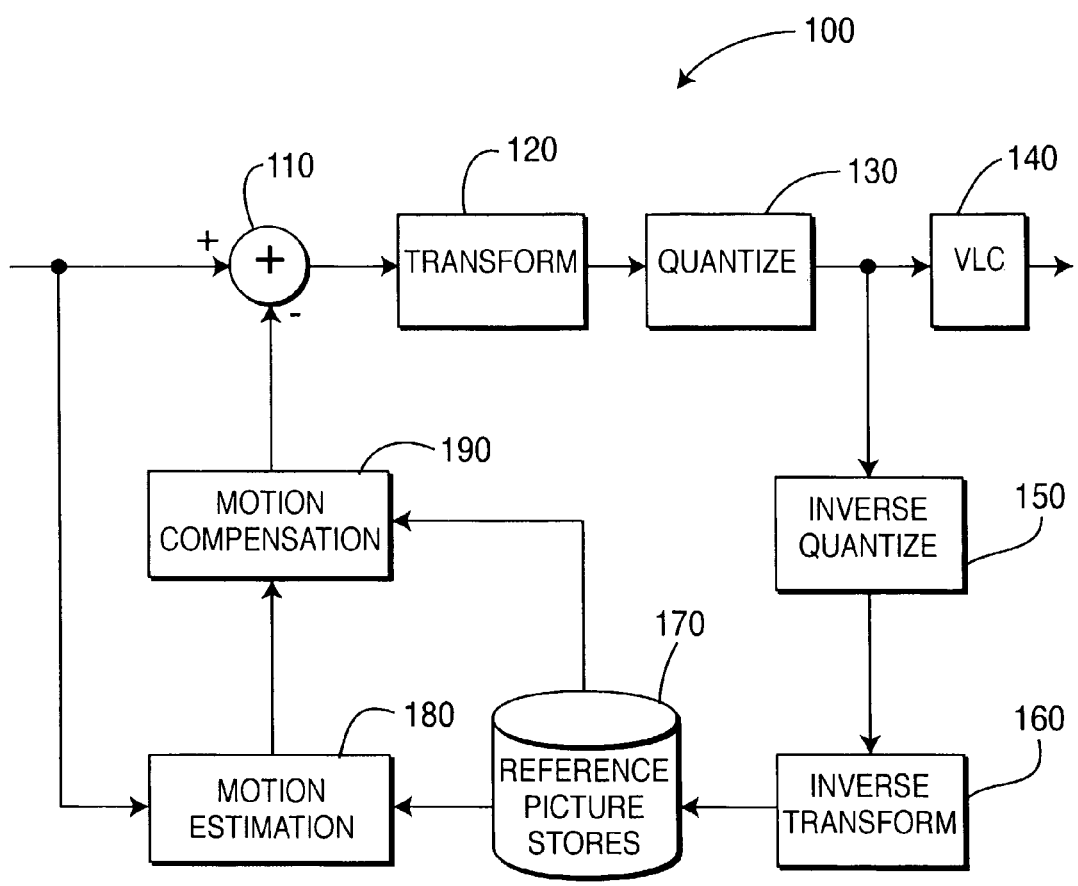
FIG. 1 shows a block diagram of a video encoder with fast motion estimation for multiple reference pictures in accordance with the principles of the present invention.

The present invention is an apparatus and method for fast motion estimation with multiple reference pictures. Embodiments of the present invention are used in fast motion estimation for multiple reference pictures to achieve video compression. When a block is predicted from multiple reference pictures, the motion estimation is performed from these reference pictures. Therefore, in the instant embodiment of the present invention the computational burden of the motion search may be reduced.

In a preferred embodiment, scene detection is used such that none of the reference frames fall across a scene change. The prediction from the closest reference frame is calculated. The farthest reference frame is determined by buffer size. A threshold is used to determine whether the current prediction is sufficient.

The following description merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means that can provide those functionalities as equivalent to those shown herein.

As shown in FIG. 1, a video encoder with fast motion estimation for multiple reference pictures is indicated generally by the reference numeral 100. An input to the encoder 100 is connected in signal communication with a non-inverting input of a summing junction 110. The output of the summing junction 110 is connected in signal communication with a block transformer 120. The transformer 120 is connected in signal communication with a quantizer 130. The output of the quantizer 130 is connected in signal communication with a variable length coder ("VLC") 140, where the output of the VLC 140 is an externally available output of the encoder 100.

The output of the quantizer 130 is further connected in signal communication with an inverse quantizer 150. The inverse quantizer 150 is connected in signal communication with an inverse block transformer 160, which, in turn, is connected in signal communication with a reference picture store 170. A first output of the reference picture store 170 is connected in signal communication with a first input of a fast motion estimator 180 for multiple reference pictures. The input to the encoder 100 is further connected in signal communication with a second input of the fast motion estimator 180.

Although the invention described here is conceptually part of the motion estimation block, it shall be understood that a separate fast motion estimation portion for multiple reference pictures may feed a motion estimator portion in alternate embodiments, with the signaling between the portions indicating which operating points to test or not to test. The output of the fast search block matching motion estimator 180 is connected in signal communication with a first input of a motion compensator 190. A second output of the reference picture store 170 is connected in signal communication with a second input of the motion compensator 190. The output of the motion compensator 190 is connected in signal communication with an inverting input of the summing junction 110.

Figure 2:
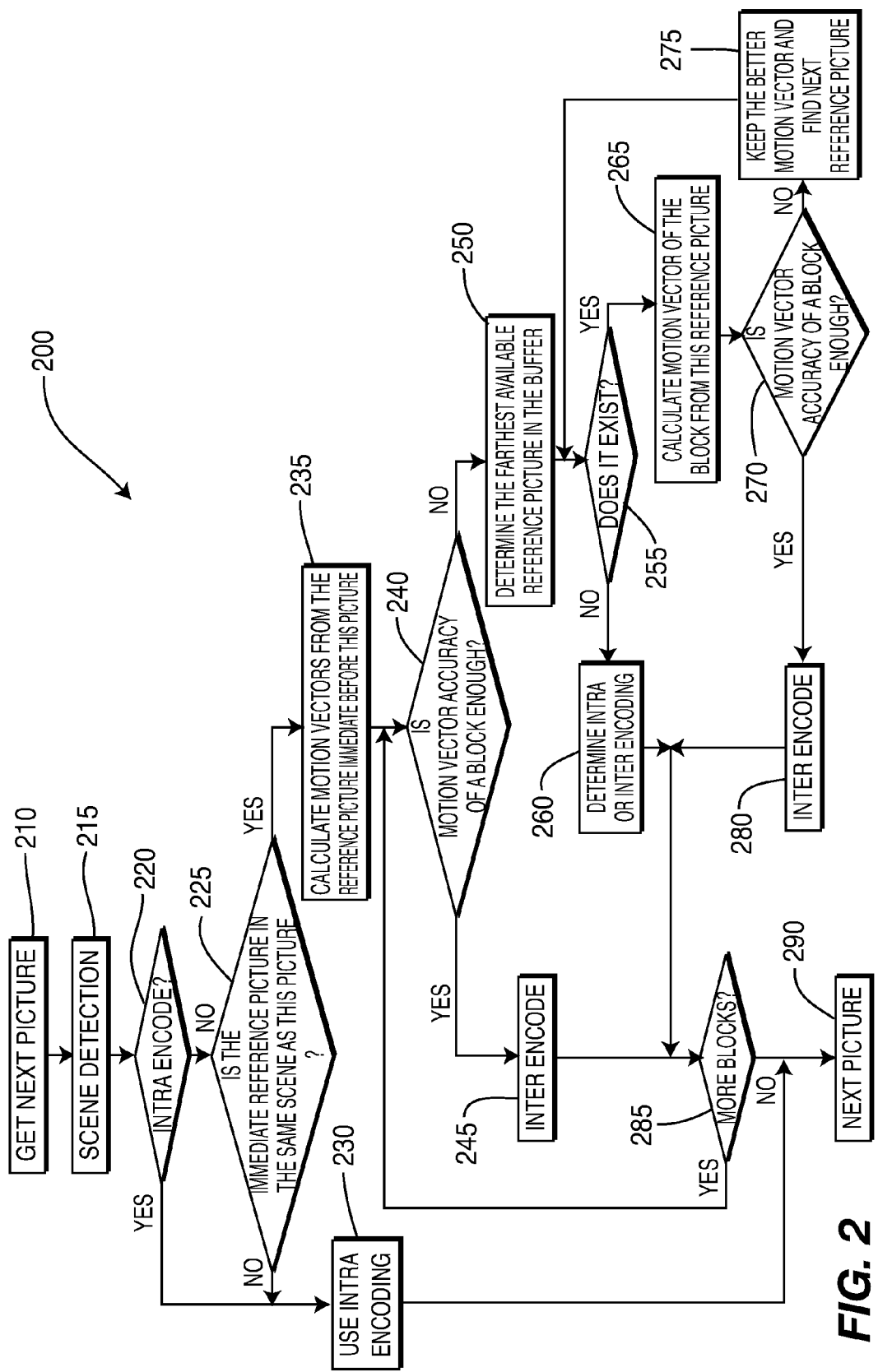
FIG. 2 shows a flow diagram for an encoding process in accordance with the principles of the present invention.

Turning to FIG. 2, an exemplary encoding process with fast motion estimation for multiple reference pictures in accordance with the present invention is indicated generally by the reference numeral 200. The word "block" as used herein has a general meaning, and can stand for macroblock, block, sub-block, or sub-block partition, for example. The process 200 includes an input step 210 that reads the next picture into the encoder uncompressed buffer, and passes control to a function step 215. The step 215 detects whether a scene change has taken place, and passes control to a function step 220.

The step 220 checks whether the picture should be encoded as an Intra or an Inter picture. This depends on encoder settings. If the picture is forced to be intra-encoded, then no reference picture is used and control is passed to step 230. Otherwise, control is passed to step 225, which checks whether the reference picture immediately before this picture is in the same scene as this picture. If it is not, depending whether it is at a P or B picture position, this picture may be intra-encoded if the encoder is set to create an intra picture at scene change, and control passes to step 230 where the picture is Intra-encoded. Otherwise, control passes to step 235, where, for each inter-encoded block, motion vectors from the reference picture immediately before this picture are calculated. If it is bi-directional encoded block, the motion vectors from the next reference picture are also calculated. If a weighted function is used, the motion vectors from the second reference picture immediately before this picture are calculated as well, should this reference picture be in the same scene as the to-be-encoded picture.

Next, control passes to step 240, which checks whether the motion vector accuracy is satisfied, or whether the error signal is small enough. If it is satisfied, then no more motion estimation is needed for this block, and control is passed to step 245. Otherwise, control is passed to step 250. At step 245, the block is inter-encoded or even skipped, where applicable. Step 250 finds the farthest available reference picture in the buffer that belongs to the same scene as the to-be-encoded picture. Normally, this reference picture is short term, but long term reference pictures are not excluded in alternate embodiments. Next, step 255 determines if such a reference picture does not exist, and if not, passes control to step 260. Otherwise control passes to step 265. Step 260 is used to determine whether this block is intra-encoded, inter-encoded, or skipped. The costs of each are calculated and compared.

At step 265, the motion vectors from this reference picture are calculated, and motion vectors from other reference pictures may be calculated, too, depending on whether it is a bi-directional prediction, or weighted, for example. At step 270, if the motion vector accuracy is satisfied, then inter-encoding is performed. A decision for intra or inter encoding may still be made in some cases. At step 275, if the motion vector accuracy is not satisfied, the error signal is kept in order to compare to those from other reference pictures. Then, the next reference picture is selected. The approach of selecting the reference picture can be different. One exemplary embodiment is described in the instant description, but those of ordinary skill in the art may substitute other comparable approaches. At step 280, the block is inter-encoded, and control is passed to step 285. Step 285 encodes the next block if there are more blocks in the picture, and otherwise encodes the next picture.

Figure 3:
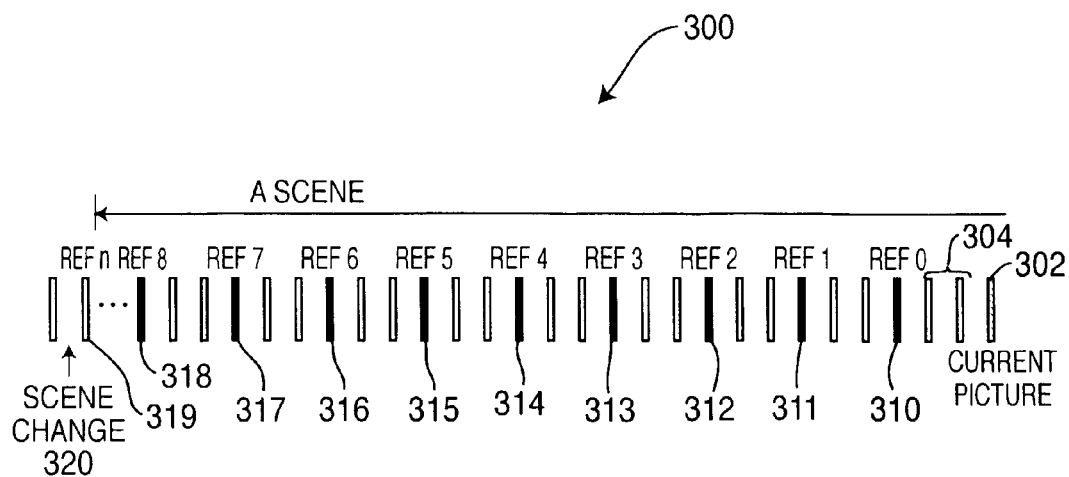
FIG. 3 shows a data diagram for multiple reference pictures in accordance with the principles of the present invention.

Turning now to FIG. 3, a data diagram for multiple reference pictures in accordance with the principles of the present invention is indicated generally by the reference numeral 300. The data diagram 300 corresponds to a scene, and includes a current picture 302, non-reference pictures 304, reference pictures 310, 311, 312, 313, 314, 315, 316, 317, 318 and 319, and a scene change 320.

Figure 4:
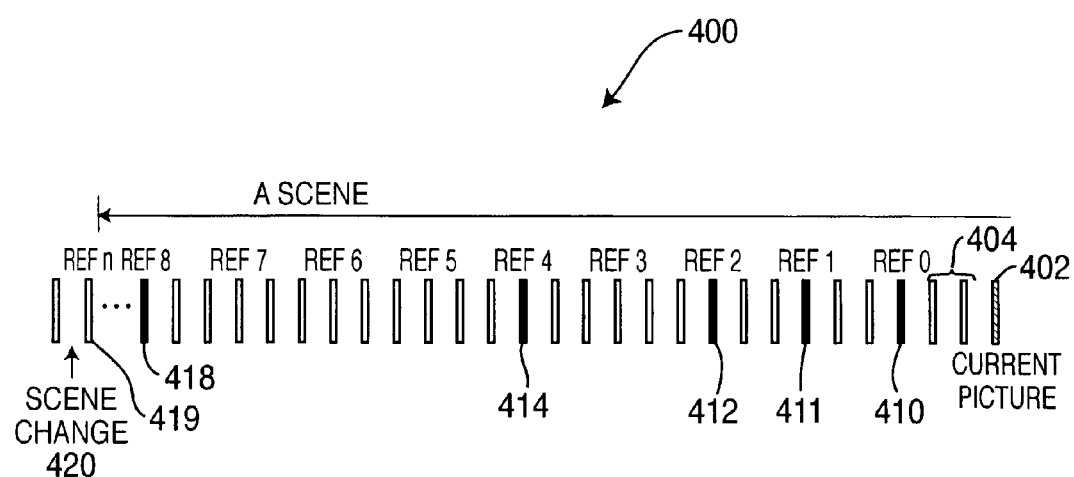
FIG. 4 shows another data diagram for multiple reference pictures in accordance with the principles of the present invention.

As shown in FIG. 4, another data diagram for multiple reference pictures in accordance with the principles of the present invention is indicated generally by the reference numeral 400. The data diagram 400 corresponds to a scene, and includes a current picture 402, non-reference pictures 404, reference pictures 410, 411, 412, 414 and 418, and a scene change 420.

Multiple reference pictures are used for video encoding to achieve better compression, such as up to 15 reference frames in the case of the JVT standard. The motion vectors of a predicted block could be calculated from all of the reference pictures, and then the best prediction could be chosen for that block. Thus, the computational burden of the motion estimation could be 15 times as much as for one reference picture.

In operation, embodiments of the present invention achieve both the compression advantages of multiple reference pictures as well as fast motion estimation. Preferred embodiments utilize scene detection and wisely chosen reference pictures, and terminate the motion estimation process once it is sufficient.

Scene detection is employed to detect a scene change. For example, an Average of Absolute Difference Threshold Scene Detection ("AADTSD") works as follows:

$$AAD = \frac{1}{N}\sum_{i}^{N} |P_i - P_{ri}| \qquad \text{(Eqn. 1)}$$

where AAD is average of absolute difference; N is the number of pixels in a picture; Pi is a value of component of pixel i in current picture, and Pri is a value in a reference picture. All components can be used:

$$AAD = \frac{1}{N}\sum_{j}^{M}\sum_{i}^{N} |P_{ji} - P_{r,ji}| \qquad \text{(Eqn. 2)}$$

where M is number of components, it is from 1 to 4.

As will be recognized by those of ordinary skill in the pertinent art, various other forms of scene detection may be substituted herein for the exemplary AADTSD method.

If the average of absolute differences is greater than a threshold, then the current picture and the reference picture belong to different scenes. Otherwise, they are in the same scene. If the current picture and the reference picture are adjacent and belong to different scenes, then there is a scene change between them. The threshold can be predetermined or can be changed adaptively.

The exemplary embodiment uses the following criteria to select reference pictures. A reference picture always belongs to the same scene as the predicted picture. If there is no such reference picture, then the predicted picture is encoded as an intra picture. The motion of the closest reference picture is always calculated, if it exists.

The farthest reference picture is determined by the encoding buffer size, or the number of pictures that can be stored in the buffer. For example, if the buffer can hold 5 reference pictures, the nearest 5 reference pictures can be stored. Another example is shown in FIG. 3, where the farthest picture or the first picture 319 of the scene 320, and the closest reference pictures 310 through 318 are stored. A further example is illustrated in FIG. 4, where the reference pictures with distance $2^n$ (n=0, 1, 2, . . . ) from the first reference picture can be used for motion estimation, such as ref 0, ref 1, ref 2, ref 4, as shown in FIG. 4.

The motion estimation search starts with the closest reference picture, ref 0. For a given block, if the prediction error ("PE") is within a limit, then no further motion estimation is needed or performed. The PE can be calculated with Sum of Absolute Differences ("SAD"), or Mean Square Prediction Error ("MSPE"), for example, although substitute calculations may be used by those of ordinary skill in the pertinent art. If the PE is above the threshold, there are two options. One option is to use the farthest reference picture to calculate prediction, and then work toward the closest reference picture, if it is necessary. The other option is to use the closest reference picture, and then work towards the farthest, if necessary.

The computational savings of embodiments of the present invention can be applied to other applications, such as, for example, expanding the searching range or adapting better algorithms for other usages. Embodiments of the present invention can be used directly with many different video compression standards that employ motion estimation, such as, for example, H.261, H.263, H.264, MPEG-1, MPEG-2, and MPEG-4.

These and other features and advantages of the present invention may be readily ascertained by one of ordinary skill in the pertinent art based on the teachings herein. It is to be understood that the principles of the present invention may be implemented in various forms of hardware, software, firmware, special purpose processors, or combinations thereof.

Most preferably, the principles of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. An apparatus, comprising:
a video encoder, implemented at least partially in hardware, that encodes video data for an image block relative to a plurality of reference pictures, the encoder having a fast motion estimator that provides motion vectors corresponding to one of the plurality of reference pictures, the motion estimator comprising a scene detection portion that performs fast motion estimation while excluding reference pictures that fall across a scene change, wherein the image block is comprised within a current picture, and the motion estimator performs the fast motion estimation starting with a farthest reference picture from the current picture in a current scene such that a prediction from the farthest reference picture is calculated prior to calculating predictions from other reference pictures that are closer to the current picture in the current scene.

2. The apparatus of claim 1, further comprising a thresholding portion that computes a prediction error for the one of the plurality of reference pictures, compares the computed prediction error to a threshold, and selects another one of the plurality of reference pictures if the prediction error exceeds the threshold.

3. The apparatus of claim 2 wherein the prediction errors is responsive to at least one of a sum of the absolute difference and a mean square prediction error.

4. The apparatus of claim 2, wherein the selected other one of the plurality of reference pictures is the next reference picture displaced from the first reference picture by a position corresponding to X raised to the N power.

5. The apparatus of claim 4, wherein X is 2 and N is an integer.

6. The apparatus of claim 1 wherein the farthest reference picture is determined by buffer size.

7. The apparatus of claim 1, further comprising a reference picture store in signal communication with the fast motion estimator that provides the one of the plurality of reference pictures.

8. The apparatus of claim 1, further comprising a motion compensator in signal communication with the fast motion estimator for providing motion compensated reference pictures responsive to the fast motion estimator.

9. The apparatus of claim 1, wherein the thresholding portion selects another one of the plurality of reference pictures from the current scene, computes motion vectors corresponding to the other one of the plurality of reference pictures, and computes a prediction error for the other one of the plurality of reference pictures.

10. The apparatus of claim 9, wherein the thresholding portion compares the computed prediction error to a threshold and the video encoder intra codes the current picture if the prediction error exceeds the threshold.

11. The apparatus of claim 9, wherein the thresholding portion compares the computed prediction error for the one of the plurality of reference pictures to the computed prediction error for the other one of the plurality of reference pictures, and
selects the reference picture with the lower computed prediction error.

12. The apparatus of claim 1, wherein the fast motion estimator block matches the image block in correspondence with the one of the plurality of reference pictures within the current scene, and motion compensates the one of the plurality of reference pictures in correspondence with the motion vectors.

13. A method for encoding video data for an image block having a plurality of reference pictures, the method comprising:
receiving an uncompressed image block;
detecting a scene change;
excluding reference pictures that fall across the scene change; and
computing motion vectors corresponding to a difference between the image block and one of the plurality of reference pictures,
wherein the image block is comprised within a current picture, and said computing step computes the motion vectors starting with a farthest reference picture from the current picture in a current scene such that a prediction from the farthest reference picture is calculated prior to calculating predictions from other reference pictures that are closer to the current picture in the current scene, and wherein the method is performed in a video encoder.

14. The method as defined in claim 13, further comprising: computing a prediction error for the one of the plurality of reference pictures; comparing the computed prediction error to a threshold; and selecting another one of the plurality of reference pictures if the prediction error exceeds the threshold.

15. The method as defined in claim 14 wherein the selected other one of the plurality of reference pictures is the next reference picture displaced from the first reference picture by a position corresponding to X raised to the N power.

16. The method as defined in claim 15 wherein X is 2 and N is an integer.

17. The method as defined in claim 14 wherein the prediction error is responsive to at least one of a sum of absolute differences and a mean square prediction error.

18. The method as defined in claim 13 adapted for encoding video signal data for an image block relative to a plurality of reference pictures, the method further comprising:
selecting another one of the plurality of reference pictures from the current scene;
computing motion vectors corresponding to the other one of the plurality of reference pictures; and
computing a prediction error for the other one of the plurality of reference pictures.

19. The method as defined in claim 18, further comprising: comparing the computed prediction error to a threshold; and intra coding the current picture if the prediction error exceeds the threshold.

20. The method as defined in claim 18, further comprising: comparing the computed prediction error for the one of the plurality of reference pictures to the computed prediction error for the other one of the plurality of reference pictures; and selecting the reference picture with the lower computed prediction error.

21. The A method as defined in claim 13, further comprising block matching the image block in correspondence with the one of the plurality of reference pictures within the current scene; and
motion compensating the one of the plurality of reference pictures in correspondence with the motion vectors.

22. The method of claim 13 wherein the furthest reference picture is determined by buffer size.

23. The method of claim 13 further comprising providing the one of the plurality of reference pictures from a reference picture store.

24. The method of claim 13 further comprising providing motion compensated reference pictures from a motion compensator.

\* \* \* \* \*